(12) United States Patent
Politzer

(10) Patent No.: US 7,726,810 B2
(45) Date of Patent: Jun. 1, 2010

(54) TILTED PRISM FOR THE TREATMENT OF CYCLO DEVIATION

(76) Inventor: Thomas A. Politzer, 404 Ridge Rd., Golden, CO (US) 80403

( * ) Notice: Subject to any disclaimer, the term of this patent is extended or adjusted under 35 U.S.C. 154(b) by 0 days.

(21) Appl. No.: 11/840,390

(22) Filed: Aug. 17, 2007

(65) Prior Publication Data

US 2009/0046245 A1    Feb. 19, 2009

(51) Int. Cl.
*G02C 7/02* (2006.01)
(52) U.S. Cl. .................................. 351/175
(58) Field of Classification Search ............ 351/203, 351/175
See application file for complete search history.

(56) References Cited

U.S. PATENT DOCUMENTS

| 2,230,993 A | | 2/1941 | Ames, Jr. et al. |
| 2,542,789 A | | 2/1951 | Ames, Jr. |
| 3,460,530 A | | 8/1969 | Lorenz |
| 4,647,165 A | * | 3/1987 | Lewis ........................... 351/59 |
| 5,216,454 A | * | 6/1993 | Berke ........................... 351/43 |
| 6,129,435 A | * | 10/2000 | Reichow et al. ................ 351/41 |
| 6,280,031 B1 | * | 8/2001 | Zerkle ........................... 351/158 |
| 6,755,525 B2 | * | 6/2004 | Reichow et al. ............. 351/178 |

FOREIGN PATENT DOCUMENTS

| EP | 0 116 093 A1 | 2/1984 |
| EP | 0 076 857 B1 | 6/1985 |

* cited by examiner

*Primary Examiner*—Joseph Martinez
*Assistant Examiner*—James R Greece
(74) *Attorney, Agent, or Firm*—Marsh Fischmann & Breyfogle LLP

(57) ABSTRACT

A system for treatment of cyclo deviation of one or both eyes of a patient and related methods are disclosed. The system for treatment of cyclo deviation may include eyeglasses with lenses and a frame wherein at least one of the lenses is a prism. The prism may be disposed such that a primary plane of the prism does not lie perpendicular to the primary gaze of the patient. The prism may be rotated such that it is not co-planar with the other lens of the eyeglasses. For example, the prism may be oriented in a base-out configuration and also be tilted in a pantoscopic (e.g., top out) or retroscopic (e.g., bottom out) manner.

37 Claims, 5 Drawing Sheets

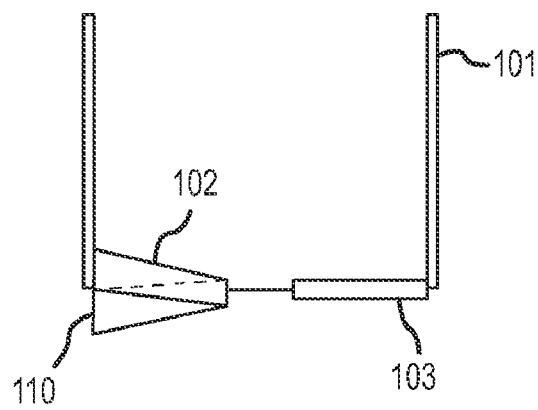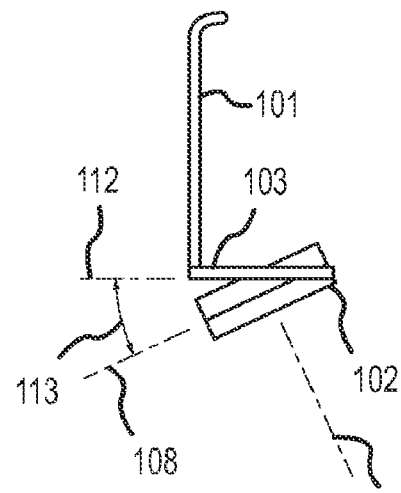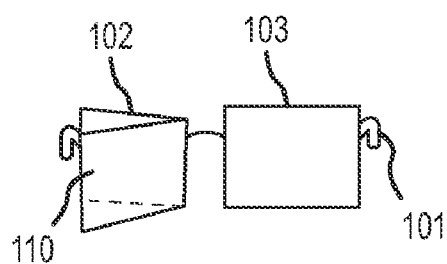
FIG.1B    FIG.1C
FIG.1D

TILTED PRISM FOR THE TREATMENT OF CYCLO DEVIATION

FIELD OF THE INVENTION

The present invention generally relates to vision correction, and more particularly, to the correction of vision in a patient with cyclo deviation of one or both eyes.

BACKGROUND OF THE INVENTION

Binocular double vision is a serious and often intolerable visual condition. Double vision arises when there is an acquired, decompensated, and/or non-suppressed strabismus. Strabismus refers to the misalignment of the eyes so that one eye deviates in, out, up, down, rotationally, or a combination thereof relative to the other eye.

Many treatments have been successfully used over the years to correct or reduce double vision. These include the use of medications, lenses, patching, surgery and prism.

Of particular difficulty is the treatment of a cyclo deviation where one eye is rotated either clockwise or counterclockwise relative to the other eye. Most commonly, the rotationally deviating eye is caused from damage to the Fourth Cranial Nerve (CNIV) and/or its innervated muscle, the Superior Oblique. The function of this muscle is to lower the gaze of the eye when it is at adducted (turned inward) and to incyclo rotate the eye in all positions except for adduction.

When the deviation of an eye is linear, i.e., turned in, out, up, down, or on an angle, prism can be effectively used to compensate for the amount of the deviation. Exceptions are where there is a paretic or paralytic muscle involved, and then the amount of deviation varies with the direction of gaze. In these conditions prism is still beneficial, but may not be fully compensatory. When there is a rotational deviation, known applications of prisms used in lenses for eyeglasses are ineffective.

SUMMARY OF THE INVENTION

Accordingly, it would be desirable to provide apparatuses and methods that are operable to treat cyclo deviation in a patient. The present inventor has recognized that a prism lens used in a pair of eyeglasses may be used to treat cyclo deviation by rotating a prism lens about an axis extending in the direction of the base of the prism. Such a rotation results in a corresponding two-dimensional displacement of the image seen through the prism lens. This two-dimensional displacement simulates rotational displacement and may be successful in treating cyclo deviations. Moreover, both lenses of the eyeglasses may be prism lenses used in the above-described manner. The two prism lenses may be similarly oriented (e.g., for treatment in patients where cyclo deviation in each eye is similar) or uniquely oriented (e.g., for treatment in patients where cyclo deviation in each eye is unique).

A first aspect of the present invention is embodied by eyeglasses for the treatment of cyclo deviation in a patient. The eyeglasses for the treatment of cyclo deviation may generally include a first lens that includes a first prism. The first prism may have a first prism direction of base and a first prism primary plane. As used herein, the primary plane of a prism is a plane that is equidistant from both corrective surfaces of the lens (or a best fit plane in instances where the corrective surfaces are curved). The eyeglasses may include a second lens. The first and second lenses may be mounted to a frame such that an axis perpendicular to the first prism direction of base and within the first prism primary plane is not parallel to the second lens.

The first prism may be oriented laterally (e.g., base-out or base-in), vertically (base-up or base-down), or with the direction of base at any appropriate angle relative to a horizontal and/or vertical meridian. In embodiments where the first prism is oriented laterally, the first prism may further be tilted about the horizontal meridian. The tilt about the horizontal meridian may be pantoscopic or retroscopic. In embodiments where the first prism is oriented vertically, the first prism may further be rotated about the vertical meridian. The rotation about the vertical meridian may be abductive or adductive. In embodiments where the direction of base is at an angle relative to the horizontal and/or vertical meridian, the first prism may be further rotated about an axis of the first prism that corresponds to the direction of base.

The second lens may be a second prism that may be configured in any manner as described with respect to the first prism. The first prism and second prism may be configured differently. For example, where the patient has differing cyclo deviations in each eye, the first and second prisms may be configured to treat the particular cyclo deviation of each eye, respectively. For instance, an axis perpendicular to the first prism direction of base and within the first prism primary plane may not be parallel to an axis perpendicular to the second prism direction of base and within the second prism primary plane.

To achieve the above-described configurations, the prism lenses described herein may include elliptical bevels along the perimeter of the lenses. Furthermore, the lenses described herein, both prism and non-prism, may correct vision defects other than, or in addition to, cyclo deviation. In embodiments of eyeglasses that include a first prism and a second lens that is not a prism, an axis perpendicular to the first prism direction of the base and within the first prism primary plane may be at an angle with respect to the second lens.

A second aspect of the present invention is embodied by an apparatus for treatment of cyclo deviation in a patient. The apparatus for treatment of cyclo deviation may generally include a first lens that includes a prism. The prism may have a prism direction of base and a prism primary plane. The prism may be rotated about an axis along the direction of base such that the prism primary plane is oblique relative to a primary gaze axis of a wearer of the eyeglasses. The apparatus may further include a second lens and a frame. The first and second lenses may be mounted to the frame. In an embodiment, one or both of the lenses may correct vision defects other than, or in addition to, cyclo deviation.

A third aspect of the present invention is embodied by an apparatus for treatment of cyclo deviation in a patient that includes a first lens that includes a prism, a second lens, and a frame. The first and second lenses may be mounted in the frame such that the first lens is tilted relative to the second lens such that the first lens and the second lens are not co-planar.

In some embodiments, the first lens may be tilted in a pantoscopic manner relative to the second lens. In some other embodiments, the first lens may be tilted in a retroscopic manner relative to the second lens.

A fourth aspect of the present invention is embodied by an apparatus for treatment of cyclo deviation in a patient that includes a first lens that includes a prism, a second lens, and a frame. The first and second lenses may be mounted to the frame such that the first and second lenses are mounted asymmetrically with respect to each other relative to a midsagittal plane of the patient when the patient is wearing the apparatus.

Various refinements exist of the features noted in relation to the first, second, third, and fourth aspects of the present invention. Further features may also be incorporated in the first, second, third, and fourth aspects of the present invention as well. These refinements and additional features may exist individually or in any combination. The various features discussed above in relation to the first, second, third, and fourth aspects of the present invention may be utilized by any of the aspects of the present invention as well.

A fifth aspect of the present invention is embodied by a method of treating cyclo deviation in a patient. The method may include a patient wearing eyeglasses that include a first lens that includes a prism and a second lens. The first lens may have a prism primary plane that is oblique relative to the second lens.

Various refinements exist of the features noted in relation to the fifth aspect of the present invention. Further features may also be incorporated in the fifth aspect of the present invention as well. These refinements and additional features may exist individually or in any combination. The method of the fifth aspect may be performed using various apparatuses and features discussed above in relation to the first, second, third, and fourth aspects of the present invention. Additional aspects and corresponding advantages will be apparent to those skilled in the art upon consideration of the further description that follows.

BRIEF DESCRIPTION OF THE DRAWINGS

FIG. 1B is a top view of the eyeglasses of FIG. 1A.
FIG. 1C is a side view of the eyeglasses of FIG. 1A.
FIG. 1D is a front view of the eyeglasses of FIG. 1A.

DETAILED DESCRIPTION

Figure 1A:
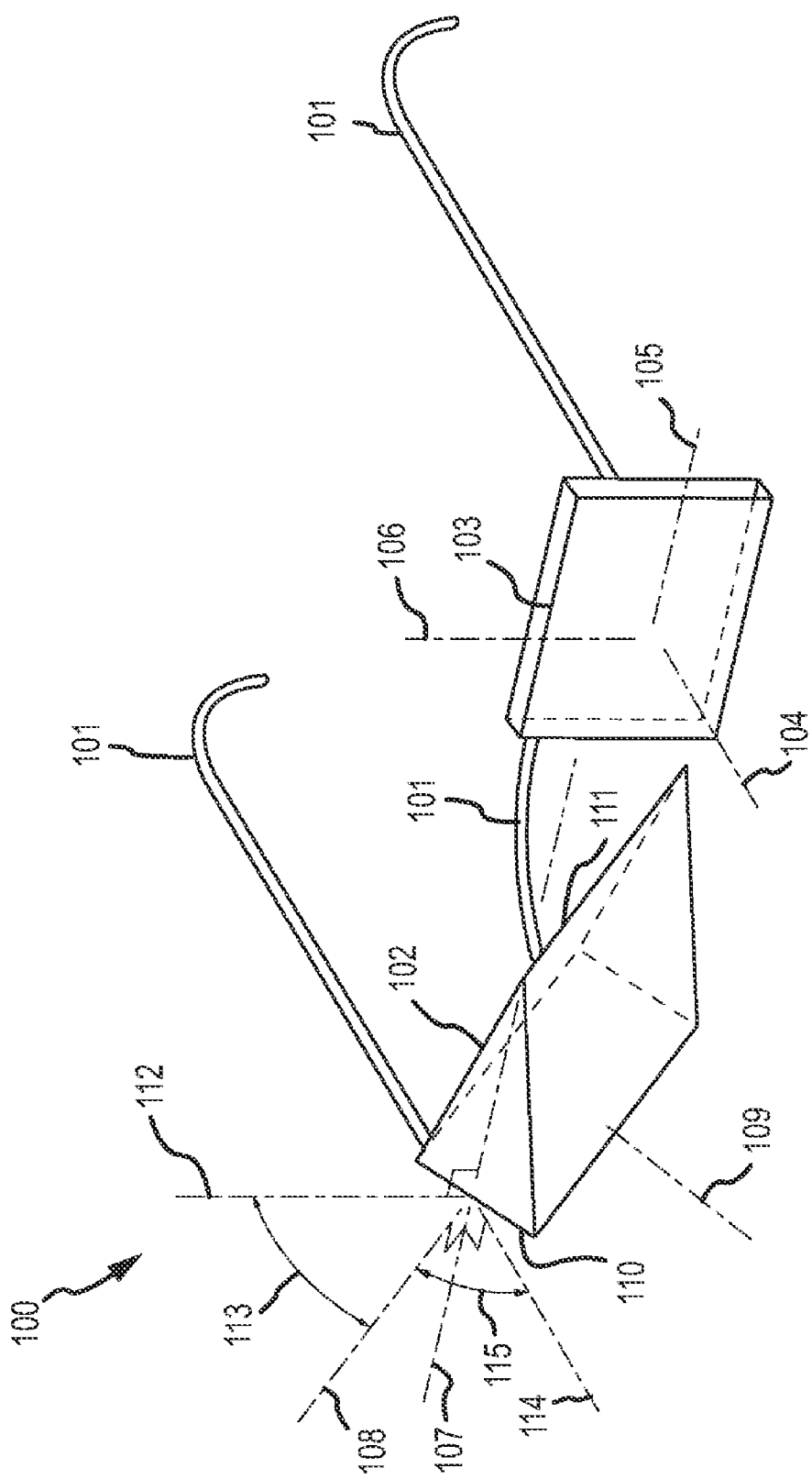
FIG. 1A is a perspective view of one embodiment of eyeglasses for treating cyclo deviation in a patient.

The apparatuses and methods disclosed and claimed herein can be made and executed without undue experimentation in light of the present disclosure. While the apparatuses and methods of this invention have been described in terms of preferred embodiments, it will be apparent to those of skill in the art that variations may be applied to the apparatuses and in the steps or in the sequence of steps of the methods described herein without departing from the concept, spirit and scope of the invention. More specifically, it will be apparent that certain dimensions and/or locations of the various components making embodiments of the invention may be varied to achieve the same or similar results. While configurations depicted in the drawings indicate particular component and/or feature locations, the skilled artisan will recognize that the manner of operation of the embodiments of the invention does not require these locations be precisely as shown. The manner of operation of embodiments of the invention will not be significantly affected if these locations are not precisely observed. Thus, all similar substitutes and modifications apparent to those skilled in the art are deemed to be within the spirit, scope and concept of the invention as defined by the appended claims.

FIGS. 1A though 1D generally illustrate an embodiment of eyeglasses 100 for treating cyclo deviation in a patient. The eyeglasses 100 may include a frame 101. Lenses 102 and 103 may be mounted to the frame 101. When the eyeglasses 100 are worn by a patient, the frame 101 may serve to locate the lenses 102 and 103 relative to the eyes of the patient. Various features, such as shape and thickness, of the lenses 102 and 103 are simplified and/or exaggerated to aid in explanation. For example, lens 103 is illustrated as generally rectangular, flat and of constant thickness so that various axes related to the positioning of the lens 103 are easily understandable. It will be appreciated that other shapes and configuration for lenses of eyeglasses known to those skilled in the art may be utilized in place of the configurations illustrated in FIGS. 1A through 1D.

Lens 103 may be a standard lens in a standard orientation known to those skilled in the art. The lens 103 may be oriented such that it is perpendicular to a primary gaze axis 104 of the corresponding eye of a patient wearing the eyeglasses 100. The primary gaze axis 104 is a theoretical axis for a normal eye (e.g., where the eye would be oriented absent any anomalies such as cyclo deviation) and is also commonly referred to as the straight gaze axis or center gaze axis. Generally, the lens 103 may be of any appropriate size, shape, configuration, and/or type.

Prism lens 102 may be oriented in such a manner as to be operable to treat cyclo deviation of the corresponding eye of a patient. For example and as shown in FIGS. 1A through 1D, prism lens 102 is the right lens and may be operable to treat a cyclo deviation of the right eye of the patient. Alternatively, prism lens 102 may be oriented in front of the left eye of the patient to treat cyclo deviation of the left eye, or lenses such as prism lens 102 may be oriented in front of both eyes to treat cyclo deviation present in both eyes of a patient. In the latter case, the two lenses may be configured and/or oriented differently to individually treat the cyclo deviation of each eye. The orientation of the prism lens 102 may be characterized as being something other than the mirror image (mirrored about the midsagittal plane of a patient wearing the eyeglasses 100) of the orientation of the lens 103. The orientation of the prism lens 102 may be characterized as being such that the prism lens 102 is not co-planar with the lens 103.

Returning to FIGS. 1A though 1D, the prism lens 102 generally will have a base oriented in a particular direction. In the illustrated embodiment, the base of prism lens 102 is identified by reference numeral 110. Typically, a prism lens will be described as base-in, base-out, base-up, or base-down to indicate the direction of base of the prism lens. A numerical value representing the angular position of the base may also be used. Prism lens 102 is shown with a base-out configuration. Accordingly, the direction of base for prism lens 102 lies along a horizontal axis, such as axis 107, which is parallel to a horizontal meridian 105. The prism lens 102 may also have a primary plane. As used herein, the primary plane of a prism lens is a plane that is equidistant from both corrective surfaces of the lens (or a best fit plane in instances where the corrective surfaces are curved). The prism lens 102 may also have an axis 108 perpendicular to the direction of base and within the primary plane of prism lens 102. The prism lens 102 may also have an axis 109 perpendicular to the primary plane.

The base 110 of the prism lens 102 is shown as a flat surface in FIGS. 1A through 1D. However, the base 110 may be curved in eyeglasses with circular or rounded lenses, or may be of any other appropriate configuration. Along an edge of the prism lens 102 opposite from the base 110 may be the thin edge 111 of the prism lens 102. The prism lens 102 is illustrated as having a generally rectangular outline in the primary plane of the prism lens 102. This is for illustration purposes only; the prism lens 102 may be configured in any appropriate shape (e.g., rounded, circular, etc.) known to those skilled in the art.

As shown in FIGS. 1A through 1D, the prism lens 102 is in a laterally oriented, base-out configuration. A base-out configuration may be advantageous since low amounts of prism (e.g., 2 or 3 prism diopters) may be easily fused at distance. Alternatively, a base-in configuration, or any other appropriate base configuration, may be used.

The prism lens 102 may be tilted about the axis 107 of the prism lens 102 to treat cyclo deviation. In the illustrated eyeglasses 100 of FIGS. 1A through 1D, the prism lens 102 is tilted in a pantoscopic manner (e.g., top out) to treat a cyclo deviation of the right eye of the patient wearing the eyeglasses 100. An angle of tilt 113 is measured between an axis 112 parallel to the vertical meridian 106 and the axis 108 of the prism lens 102. The tilt of the prism lens 102 may also be measured relative to an axis 114 parallel to the primary gaze axis 104. Such a measurement may be an angle 115 between the axis 114 parallel to the primary gaze axis 104 and the axis 108 of the prism lens 102. By tilting the prism lens 102 as shown in FIGS. 1A through 1D, the axis 108 of the prism lens 102 is disposed so that it is oblique (e.g., not parallel) relative to the lens 103. Alternatively, the prism lens 102 may be tilted in a retroscopic manner (e.g., top in).

The configuration of the prism lens 102 (e.g., the prism power or prism diopters) and the angle of tilt 113 may each be selected so that together they compensate for the cyclo deviation of the eye of the patient. By tilting the prism lens 102 about the axis 108 of the prism lens 102, a corresponding two-dimensional displacement occurs in the image seen through the prism lens 102 by a wearer of the eyeglasses 100. This two-dimensional displacement simulates rotational displacement and may be successful in treating cyclo deviations. For example, the angle 113 may be greater than 5 degrees (accordingly, the angle 115, which is complimentary to angle 113, may be less than 85 degrees). For example, the angle 113 may be greater than 10 degrees (accordingly, the angle 115 may be less than 80 degrees). For example, the angle 113 may be between 10 and 15 degrees and which may result in a two-dimensional displacement in an image seen by a wearer of the eyeglasses 100 of approximately 5 to 15 degrees. The tilt angle 113 may be of any appropriate magnitude.

To determine the angle of tilt 113 to be used for a particular patient, a comprehensive binocular vision examination may be performed to determine the cyclo deviating eye (or eyes) and the degree of cyclo deviation. This typically may include the Park 3 Step Method for determining a paretic or paralytic muscle. In addition, a vertical Maddox measurement may be made for each eye to evaluate for incyclo or excyclo deviation for each eye. Once the degree of cyclo deviation is determined, a trial frame may be used to determine the prism power and degree of prism tilt needed to treat the cyclo deviation. For example, a prism may be placed in front of a cyclo deviating eye in a base-out configuration and then incrementally tilted (e.g., in five or ten degree increments) until appropriate compensation for the cyclo deviation is achieved. Corresponding permanent eyeglasses corresponding to the trial frame may then be manufactured.

The corresponding permanent eyeglasses may be manufactured by placing a single tilted prism in front of the cyclo deviating eye, such as the eyeglasses 100 of FIG. 1A. In an alternate configuration, a second prism may be placed in front of the other eye and the second prism may be tilted in a direction opposite from the tilt of the first prism to achieve the appropriate compensation for the cyclo deviation of the deviating eye. For example, if the first prism is placed in front of the cyclo deviating eye in a base-out configuration and tilted in a pantoscopic manner, the second prism may be placed in front of the other eye in a base-out configuration and tilted in a retroscopic manner. Such an alternate configuration may be used for a patient with any amount of cyclo deviation of the deviating eye and may be particularly suitable in patients where the amount of tilt of the prism lens in a single-prism-lens configuration would exceed a predeterminable magnitude (e.g., ten or fifteen degrees).

Figure 2A:
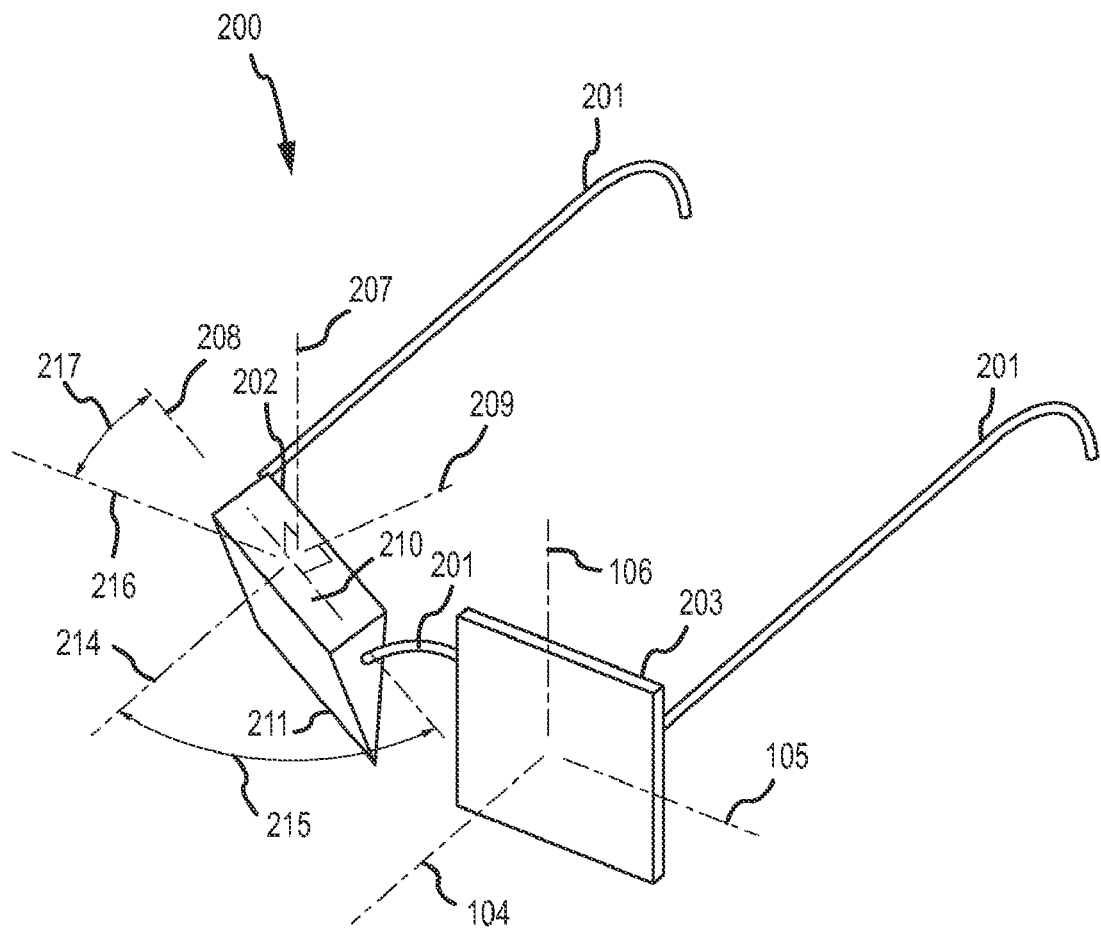
FIG. 2A is a perspective view of another embodiment of eyeglasses for treating cyclo deviation in a patient.

FIGS. 2A though 2D generally illustrate another exemplary embodiment of eyeglasses 200 for treating cyclo deviation in a patient. FIGS. 2A through 2D illustrate eyeglasses 200 configured to treat cyclo deviation in the right eye of a patient using a vertically oriented prism lens 202 in a base-up configuration. A non-prism lens 203 and the prism lens 202 may be mounted to a frame 201. As in the embodiment of FIGS. 1A through 1D, various features, such as shape and thickness, of the lenses 202 and 203 are simplified and/or exaggerated to aid in explanation.

Prism lens 202 may be vertically oriented in such a manner as to be operable to treat cyclo deviation of the corresponding eye of a patient. In the illustrated embodiment, the base of prism lens 202 is identified by reference numeral 210. The structural characteristics discussed above with regard to base 110 are equally applicable to base 210. Along an edge of the prism lens 202 opposite from the base 210 may be a thin edge 211 of the prism lens 202.

The prism lens 202 may have an axis 207 along the direction of base and an axis 208 perpendicular to the direction of base and within a primary plane of prism lens 202. The prism lens 202 may also have an axis 209 perpendicular to the primary plane. As shown in FIGS. 2A through 2D, the prism lens 202 is in a vertically oriented, base-up configuration. Alternatively, a base-down orientation may be used.

Figure 2B:
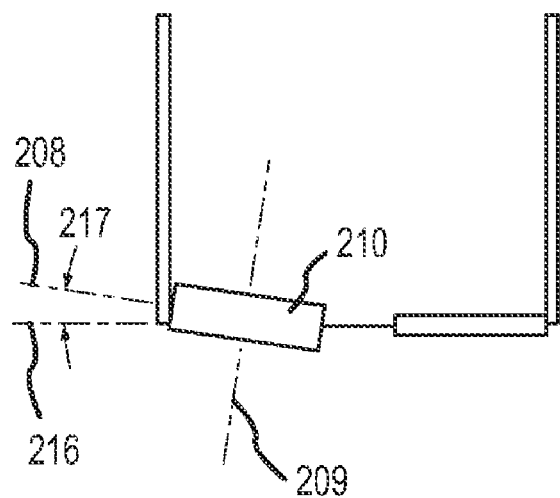
FIG. 2B is a top view of the eyeglasses of FIG. 2A.
Figure 2C:
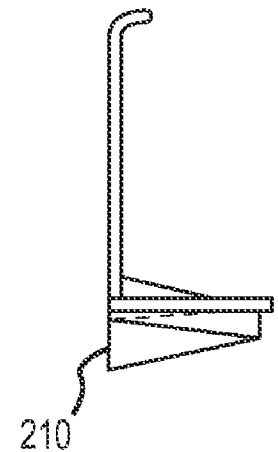
FIG. 2C is a side view of the eyeglasses of FIG. 2A.
Figure 2D:
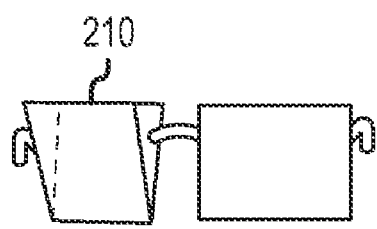
FIG. 2D is a front view of the eyeglasses of FIG. 2A.

The prism lens 202 may be rotated about the axis 207 of the prism lens 202 to treat cyclo deviation. In the illustrated eyeglasses 200 of FIGS. 2A through 2D, the prism lens 202 is rotated in an abductive manner (e.g., rotated clockwise as seen in FIG. 2B) to treat a cyclo deviation of the right eye of the patient wearing the eyeglasses 200. The angle of rotation 217 may be measured between an axis 216 parallel to the horizontal meridian 105 and the axis 208 of the prism lens 202. The rotation of the prism lens 202 may also be measured relative to an axis 214 parallel to the primary gaze axis 104. Such a measurement may be the angle 215 between the axis 214 parallel to the primary gaze axis 104 and the axis 208 of the prism lens 202. By rotating the prism lens 202 as shown in FIGS. 2A through 2D, the axis 208 of the prism lens 202 is disposed so that it is oblique relative to the lens 203. Alternatively, the prism lens 202 may be tilted in an adductive manner (e.g., rotated counterclockwise relative to the view of FIG. 2B).

As in the eyeglasses 100 of FIGS. 1A through 1D, the configuration of the prism lens 202 (e.g., the prism power or prism diopters) and the angle of rotation 217 may each be selected so that together they compensate for the cyclo deviation of the eye of the patient. The determination of prism power and degree of rotation for the eyeglasses 200 may be determined in a manner similar to that described above with reference to the eyeglasses 100 of FIGS. 1A through 1D.

In addition to treatment cyclo deviation in one or both eyes, the lenses described herein may be operable to treat other ocular conditions. For example, the lenses 102 and 103 of the eyeglasses 100 may be operable to treat cyclo deviation as discussed above and also correct for myopia or hyperopia. Alternatively, in such a patient, the eyeglasses 100 may be used to treat cyclo deviation and contact lenses may be used to treat other ocular conditions.

The eyeglasses 100 and 200 shown in FIGS. 1A through 2D illustrate prism lenses situated laterally (prism lens 102)

and vertically (prism lens 202). Other orientations may be utilized. For example, the axis 107 of prism lens 102, while still disposed parallel to the lens 103, may be disposed at an angle with respect to the horizontal meridian 105. In such a configuration, the prism lens 102 would still be tilted/rotated such that the primary plane of the prism lens 102 would not be perpendicular to an axis 114 parallel to the primary gaze axis 104 of the patient.

The eyeglasses 100 and 200 shown in FIGS. 1A through 2D illustrate eyeglasses where one of the lenses is a prism. Alternatively, both lenses of the eyeglasses may be prisms, and both lenses may be disposed such that the primary plane of the each of the prisms is not perpendicular to the primary gaze axis 104 of the patient. Such eyeglasses may be used to correct cyclo deviations occurring in a single eye of the patient or cyclo deviations occurring in each eye of the patient. For each prism, the prism power, orientation (lateral, vertical or a combination thereof), and degree of tilt/rotation may be independently determined for each eye.

Typically, a centered bevel is used along the edges of lenses for mounting the lenses within frames. In order to achieve the tilted and/or rotated prism lenses described herein, a non-centered bevel, such as an elliptical bevel may be used. In this regard, when the lens with the non-centered bevel is mounted in a frame, the appropriate tilt or rotation may be achieved.

Figure 3:
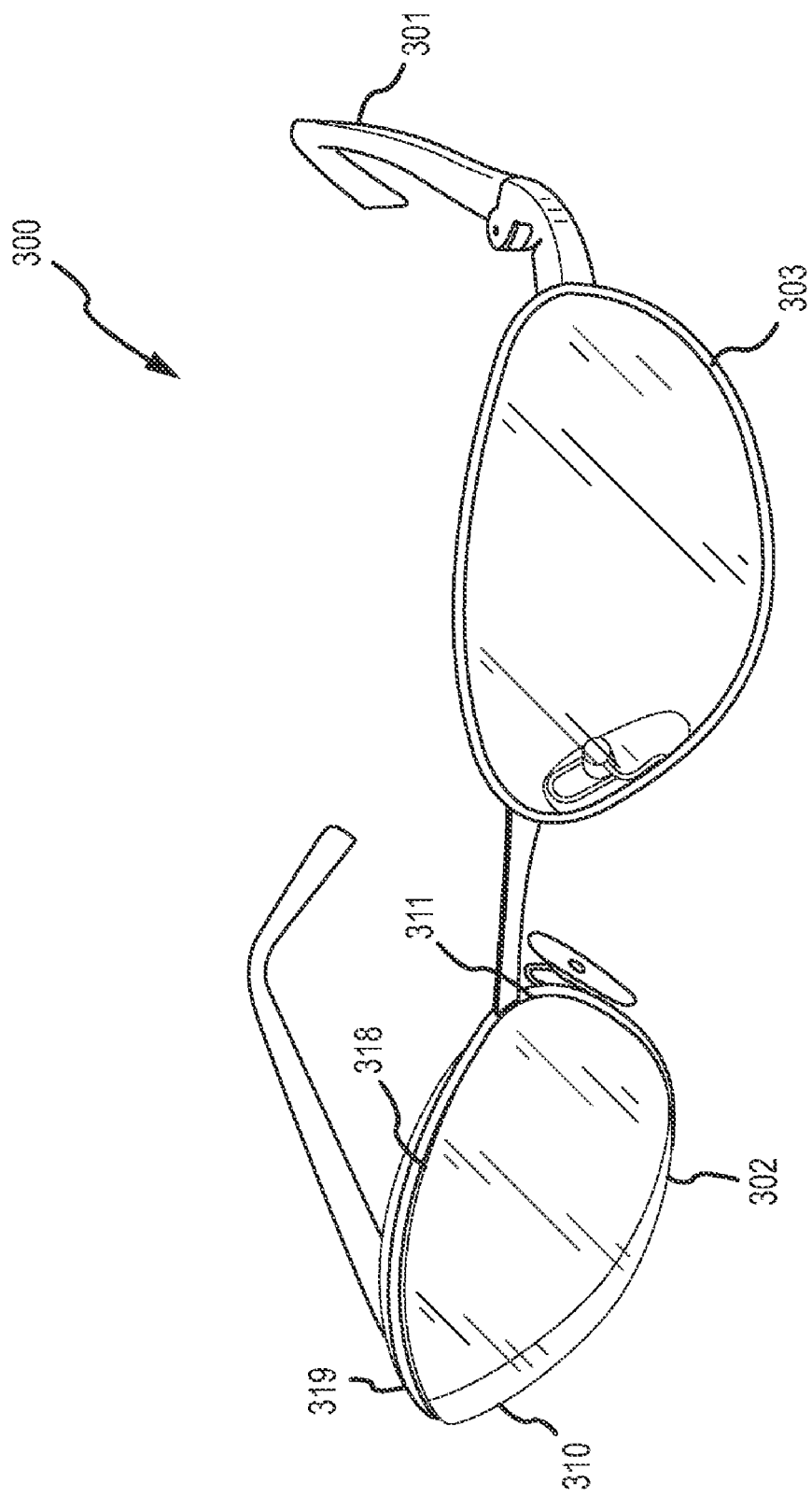
FIG. 3 is an illustration of another embodiment of eyeglasses.

As noted above, FIGS. 1A through 2D shows simplified and/or exaggerated features to aid in explanation of the features of the eyeglasses. FIG. 3 is a more dimensionally accurate illustration of an embodiment of eyeglasses 300. The eyeglasses include a prismatic lens 302 and a non-prism lens 303. The lenses 302 and 303 may correct vision anomalies in addition to cyclo deviations according to principles known to those skilled in the art. The prismatic lens 302 is oriented in the same orientation as the prism lens 102 of FIGS. 1A through 1D. The base 310 of the prismatic lens 302 is disposed along the outside edge of the eyeglasses 300 with the thin end 311 of the prismatic lens 302 disposed along the inside edge. The prism lens 302 is tilted in a pantoscopic manner with the top edge 318 tilted away from a wearer of the eyeglasses 300. The pantoscopic tilt of the prism lens 302 may be achieved by placing an elliptical bevel 319 along the perimeter of the prism lens 302.

A method of treating cyclo deviation in a patient may include the step of a patient wearing eyeglasses, such as those described herein, wherein a first lens is a prism, wherein a prism primary plane of the first lens is disposed so that it is oblique (e.g., not parallel) relative to the other lens. The angle between the prism primary plane and the other lens may be at least 5 degrees. In another embodiment, the angle between the prism primary plane and the other lens may be at least 10 degrees. In this regard, the prism primary plane may be oblique relative to the primary gaze of the patient.

The foregoing description of embodiments of the present invention has been presented for purposes of illustration and description. Furthermore, the description is not intended to limit the present invention to the forms disclosed herein. Consequently, variations and modifications commensurate with the above teachings, and skill and knowledge of the relevant art, are within the scope of the present invention. The embodiments described hereinabove are further intended to explain best modes known of practicing the present invention. The embodiments described hereinabove are further intended to enable others skilled in the art to utilize the present invention in such or other embodiments and with various modifications required by the particular application(s) or use(s). It is intended that the appended claims be construed to include alternative embodiments to the extent permitted by the prior art.

What is claimed:

1. Eyeglasses comprising:
   a first prismatic lens, wherein said first prismatic lens comprises a first prism, wherein said first prism comprises a first prism direction of base and a first prism primary plane;
   a second lens; and
   a frame, wherein said first prismatic lens and said second lens are mounted to said frame, wherein an axis perpendicular to said first prism direction of base and within said first prism primary plane is not parallel to said second lens, wherein said eyeglasses are configured for the treatment of cyclo deviation in a patient.

2. The eyeglasses of claim 1, wherein said first prism is oriented laterally.

3. The eyeglasses of claim 2, wherein said first prism is oriented in a base-out configuration.

4. The eyeglasses of claim 2, wherein said first prism is oriented in a base-in configuration.

5. The eyeglasses of claim 2, wherein said first prism is tilted about a horizontal meridian.

6. The eyeglasses of claim 5, wherein said tilt is at least 5 degrees relative to said second lens.

7. The eyeglasses of claim 6, wherein said tilt is at least 10 degrees relative to said second lens.

8. The eyeglasses of claim 5, wherein said tilting is pantoscopic.

9. The eyeglasses of claim 5, wherein said tilting is retroscopic.

10. The eyeglasses of claim 1, wherein said first prism is oriented vertically.

11. The eyeglasses of claim 10, wherein said first prism is oriented in a base-up configuration.

12. The eyeglasses of claim 10, wherein said first prism is oriented in a base-down configuration.

13. The eyeglasses of claim 10, wherein said first prism is rotated about a vertical meridian.

14. The eyeglasses of claim 13, wherein said rotation is at least 5 degrees relative to said second lens.

15. The eyeglasses of claim 14, wherein said rotation is at least 10 degrees relative to said second lens.

16. The eyeglasses of claim 1, wherein said first prismatic lens includes an elliptical bevel.

17. The eyeglasses of claim 1, wherein said second lens is a prismatic lens, wherein said second prismatic lens comprises a second prism, wherein said second prism comprises a second prism direction of base and a second prism primary plane.

18. The eyeglasses of claim 17, wherein said axis perpendicular to said first prism direction of base and within said first prism primary plane is not parallel to an axis perpendicular to said second prism direction of base and within said second prism primary plane.

19. The eyeglasses of claim 1, wherein said second lens is not a prism.

20. The eyeglasses of claim 1, wherein at least one of said first prismatic lens and said second lens corrects vision defects other than cyclo deviation.

21. The eyeglasses of claim 1, wherein said axis perpendicular to said first prism direction of the base and within said first prism primary plane is at least a 5 degree angle with said second lens.

22. The eyeglasses of claim 21, wherein said axis perpendicular to said first prism direction of the base and within said first prism primary plane is at least a 10 degree angle with said second lens.

23. Eyeglasses comprising:
a first prismatic lens, wherein said first prismatic lens comprises a first prismatic lens direction of base and a first prismatic lens primary plane;
a second lens; and
a frame, wherein said first prismatic lens and said second lens are mounted to said frame, wherein an axis perpendicular to said first prismatic lens direction of base and within said first prismatic lens primary plane is not parallel to said second lens, wherein said eyeglasses are configured for the treatment of cyclo deviation in a patient.

24. The eyeglasses of claim 23, wherein said first prismatic lens is oriented laterally.

25. The eyeglasses of claim 24, wherein said first prismatic lens is oriented in a base-out configuration.

26. The eyeglasses of claim 24, wherein said first prismatic lens is tilted about a horizontal meridian.

27. The eyeglasses of claim 26, wherein said tilt is at least 5 degrees relative to said second lens.

28. The eyeglasses of claim 26, wherein said tilting is pantoscopic.

29. The eyeglasses of claim 26, wherein said tilting is retroscopic.

30. The eyeglasses of claim 23, wherein said first prismatic lens is oriented vertically.

31. The eyeglasses of claim 30, wherein said first prismatic lens is oriented in a base-up configuration.

32. The eyeglasses of claim 30, wherein said first prismatic lens is oriented in a base-down configuration.

33. The eyeglasses of claim 23, wherein said first prismatic lens includes an elliptical bevel.

34. The eyeglasses of claim 23, wherein said second lens is a second prismatic lens, wherein said second prismatic lens comprises a second prismatic lens direction of base and a second prismatic lens primary plane.

35. The eyeglasses of claim 34, wherein said axis perpendicular to said first prismatic lens direction of base and within said first prismatic lens primary plane is not parallel to an axis perpendicular to said second prismatic lens direction of base and within said second prismatic lens primary plane.

36. The eyeglasses of claim 23, wherein at least one of said first prismatic lens and said second lens corrects vision defects other than cyclo deviation.

37. The eyeglasses of claim 23, wherein said axis perpendicular to said first prismatic lens direction of the base and within said first prismatic lens primary plane is at least a 5 degree angle with said second lens.

* * * * *